United States Patent [19]
Yamamoto et al.

[11] Patent Number: 5,207,620
[45] Date of Patent: May 4, 1993

[54] AUTOTENSIONER

[75] Inventors: Ken Yamamoto; Katsumi Furutani, both of Iwata, Japan

[73] Assignee: NTN Corporation, Osaka, Japan

[21] Appl. No.: 844,047

[22] Filed: Mar. 2, 1992

[30] Foreign Application Priority Data

Jul. 11, 1991 [JP] Japan ................ 3-53826[U]

[51] Int. Cl.⁵ .............................. F16H 7/08
[52] U.S. Cl. ..................... 474/135; 474/110
[58] Field of Search ........... 474/101, 109, 110, 111, 474/113, 117, 133, 135, 136, 138

[56] References Cited

U.S. PATENT DOCUMENTS 4,909,777 3/1990 Inoue et al. ................ 474/110
4,969,858 11/1990 Hertrich et al. ............ 474/135

Primary Examiner—Thuy M. Bui
Attorney, Agent, or Firm—Nikaido, Marmelstein, Murray & Oram

[57] ABSTRACT

A belt autotensioner capable of adjusting the fluctuating belt tension smoothly and free of shaking motion of the belt and delay in action. A tension adjusting spring is coupled to an eccentrically pivotable pulley support member. A damper for damping the pivoting speed of the support member is provided between the support member and the fixed member. The fixed member is provided with a cam surface abutting a piston of the damper. The cam surface is tapered downwards in a direction in which the support member pivots in a direction to increase the belt tension.

8 Claims, 13 Drawing Sheets

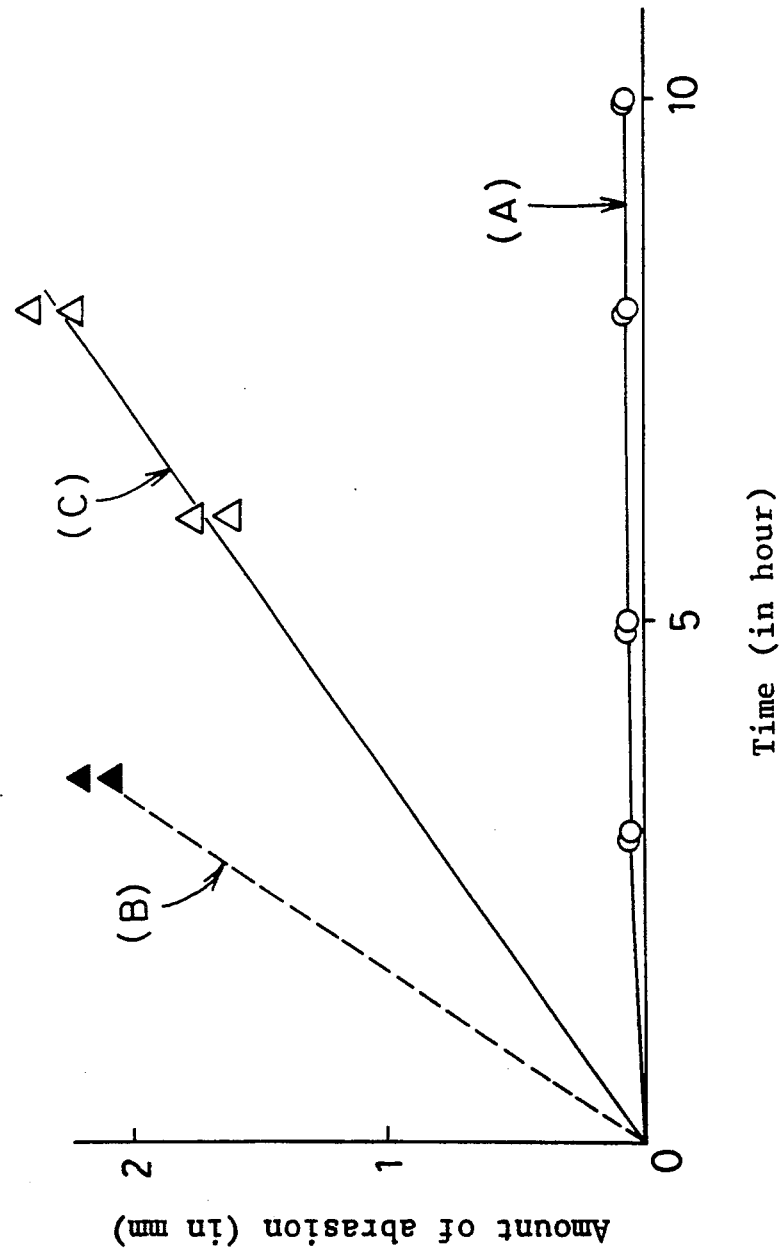

AUTOTENSIONER

This invention relates to an autotensioner for a belt such as a timing belt of an automotive engine.

An autotensioner for keeping constant the tension of a timing belt of an automotive engine is disclosed in Japanese Utility Model Unexamined Publication 1-171952.

This device comprises a tension pulley pivotally supported on a support shaft. A highly viscous oil is sealed between the pulley shaft and the support shaft. The tension of the belt is kept constant by pivoting the pulley according to the varying belt tension while supporting the load from the timing belt by the viscosity resistance of the oil.

Japanese Utility Model Unexamined Publication 1-154354 discloses a device capable of giving the pulley movement a directional property. More specifically, this device utilizes the viscosity resistance of a highly viscous oil and a one-way clutch. The one-way clutch works in such a way that the rigidity of the pulley is high at the slack side and the pulley can follow the belt movement quickly at the tight side.

But in case of the former prior art device, the viscosity resistance of the highly viscous oil does not have a directional property and the viscous resistance has to be sufficiently large to withstand the maximum load fluctuation. This inevitably results in a slow pivoting motion of the pulley both at the belt slack and tight sides. Thus, this device can cope with slow changes in tension resulting from the stretching of the belt with use or with temperature change but cannot follow sharp tension changes due to changes in the engine revolving speed so that the belt noise may be produced due to chord-like vibration of the belt.

When the engine is not in motion, the belt tension may increase at the tension pulley side depending upon the cam phases and thus the pulley may be pushed in considerably. When the engine is started in this state, the belt sometimes slackens sharply at the tension pulley side. If this happens, since the above-description prior art device cannot move the pulley quickly, the belt will slacken remarkably. As a result, teeth skipping might happen between the belt and the meshing gears.

In case of the prior art device having a one-way clutch such as the latter device, the engaging elements of clutch inevitably posses circumferential plays. If a high-frequency load or engine vibration is applied from the belt, the clutch may be worn or poor engagement (slipping or delay in action) may result due to jumping of the engaging elements.

Also, due to the varying load applied to the pulley, the engaging surface tends to suffer abnormal abrasions such as fretting. This lowers the durability of the device.

An object of this invention is to provide a belt autotensioner which can adjust the belt tension smoothly for any sharp or slow tension fluctuation of the belt, and which is free of any shaky motion or delay in action even if the loads from the belt fluctuates.

In accordance with the present invention, there is provided an autotensioner comprising a pulley, a fixing shaft, a pulley support member eccentrically supported on the fixing shaft so as to be pivotable, a tension adjusting spring coupled to the support member for applying torque to the support member in such a direction as to increase the tension of a belt, a fixed member provided opposite to the support member, a damper provided between the support member and the fixed member for damping the pivoting speed of the support member, characterized in that the damper comprises a cylinder provided in one of the support member and the fixed member, a piston mounted in the cylinder and an elastic member for urging the piston to protrude outwards from the cylinder, one of the support member and the fixing member not provided with the cylinder being provided with a cam member abutting the piston, the cam member having a cam surface tapered downwards in such a direction that the support member pivots to increase the belt tension.

When the autotensioner is fixed to the mounting base by means of the fixing bolt and the belt is put around the pulley, the pulley stops with respect to the fixing bolt when balance is achieved between the belt tension and the sum of the spring force of the tension adjusting the spring and the counterforce from the cam surfaces due to the spring force of the elastic member biasing the piston in such a direction as to protrude outward from the opening end of the cylinder.

If the belt tension increases from the balanced state, the pulley pivots eccentrically in one direction about the fixing shaft. This direction is such a direction that the piston is moved toward the higher side of the cam surface, i.e. the piston is moved backward. Thus, the back pressure of the piston in the check valve assembly increases, and the hydraulic oil leaks through a gap defined by the plunger, thus allowing the piston to retract gradually. Thus, the pulley pivots slowly.

In contrast, when the belt tension decreases from the balanced state, the pulley pivots in a direction opposite to the above, thus allowing the piston to advance. As a result, the check valve is opened and the back pressure of the piston in the valve assembly becomes zero, so that the piston advances quickly and the pulley pivots quickly. The belt tension is thus kept constant without delay in time.

Also, since the piston is always pressed against the cam surface by the biasing force of the elastic member, neither shaky motion nor wear will develop even if fluctuation loads are applied. This ensures stable operation.

According to this invention, while the belt tension is increasing, the pulley is eccentrically pivoted slowly, whereas while the belt tension is decreasing, the pulley pivots quickly in a belt stretching direction. This reduces vibration of the belt and prevent teeth skipping between the belt and gears.

Other features and objects of the present invention will become apparent from the following description taken with reference to the accompanying drawings, in which:

FIG. 25 is a graph showing how the depth of wear changes according to the material of the spacer.

FIGS. 1-7 show the first embodiment of this invention.

Figure 1:
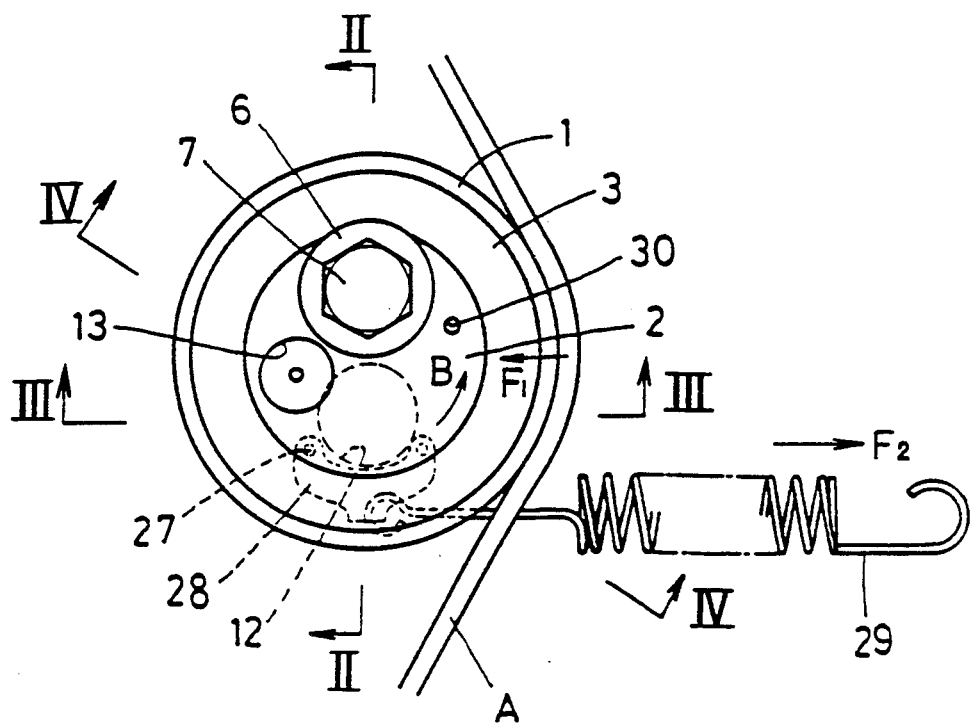
FIG. 1 is a front view of a first embodiment.
Figure 2:
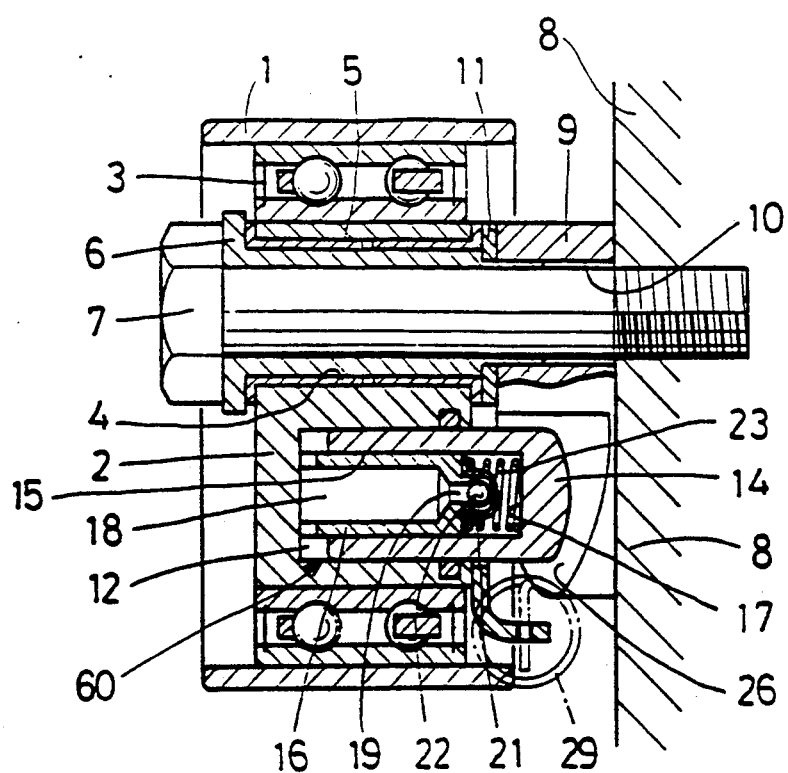
FIG. 2 is a sectional view taken along line II—II of FIG. 1.
Figure 3:
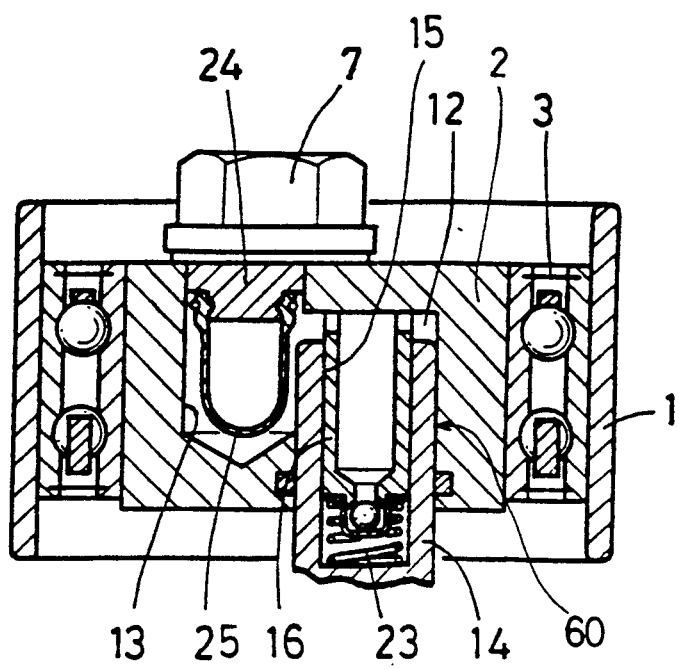
FIG. 3 is a sectional view taken along line III—III of FIG. 1.
Figure 4:
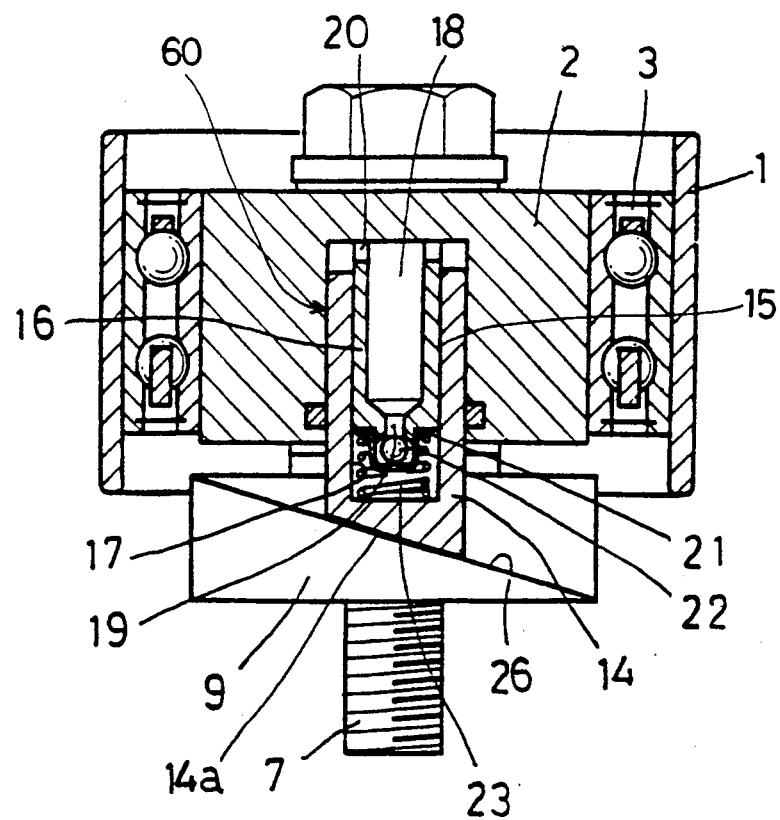
FIG. 4 is a sectional view taken along line IV—IV of FIG. 1.

As shown in FIGS. 1 and 2, a pulley 1 is rotatably supported on a disk-shaped support member 2 through a rolling bearing 3. The support member 2 is formed with a hole 4 at a location offset from the center of the pulley 1.

A fixing bolt 7 is inserted through the hole 4 through a slide bearing 5 and a collar 6. The pulley 1 is mounted at a predetermined position by screwing the fixing bolt 7 into a pulley mounting base 8 such as an engine block.

Between the support member 2 and the base 8, a fixed member 9 which also serves as a cam member is provided. It is secured to the mounting base 8 by press-fitting the end of the collar 6 into a bolt hole 10 formed therein. The slide bearing 5 has its end pressed against the surface of the fixed member 9 through an annular seat 11. The support member 2 and the pulley 1 are eccentrically pivotable about the fixing bolt 7 while sliding on the surface of the fixed member 9 and collar 6.

The supporting member 2 is provided in its front and rear end faces with a bottom closed cylinder 12 and an oil pressure adjusting chamber 13, respectively. The cylinder 12 and the oil pressure adjusting chamber 13 are located offset from the center of the pulley 1 and extend parallel to the fixing bolt 7. They partially overlap and communicate with each other inside the support member 2.

In the cylinder 12, which constitutes a damper 60, a piston 14 is slidably mounted so as to be protrudable from the opening of the cylinder. A plunger 16 is inserted in a bore 15 formed in the end of the piston 14. The interior of the piston 14 is divided into a pressure chamber 17 and a reservoir chamber 18 by the plunger 16. Some leak gap is provided between the plunger 16 and the inner wall of the piston 14.

The plunger 16 has one end thereof abutting the bottom of the cylinder 12 and is formed in the end with an oil hole 20 through which the reservoir chamber 18 and the cylinder 12 communicate with each other.

In the other end of the plunger 16, a communication passage 19 is formed through which the pressure chamber 17 and the reservoir chamber 18 communicate with each other. A check valve assembly is provided which comprises the communication passage 19, a retainer 21 provided near the pressure chamber 17, and a check valve 22 housed in the retainer 21. The check valve assembly is adapted to close the passage 19 if the pressure in the pressure chamber 17 exceeds that in the reservoir chamber 18, and open it otherwise.

Between the retainer 21 and the piston 14, a separation spring 23 is provided. The spring 23 is always compressed between the plunger 16 and the piston 14, urging them away from each other.

A lid 24 is provided in the oil pressure adjusting chamber 13 to close its opening. A diaphragm 25 is secured to the lid 24 through a snap ring. As the oil pressure in the adjusting chamber 13 changes, the diaphragm 25 expands and shrinks depending upon the pressure to keep the oil pressure constant.

On the other hand, the fixed member 9, which also serves as a cam member, is formed with a cam surface 26 on the surface opposing the piston 14. A tapered surface 14a formed on the protruding end of the piston 14 is kept in abutment with the cam surface 28. The cam surface 26 is tapered in such a way that the distance from the support member 2 increases gradually as the pulley 1 and the support member 2 pivot in a direction to stretch the belt A (direction of arrow B in FIG. 1).

A plate 28 is secured to the rear end face of the support member 2 through pins 27. One end of a tension adjusting spring 29 is coupled to the plate.

Figure 5:
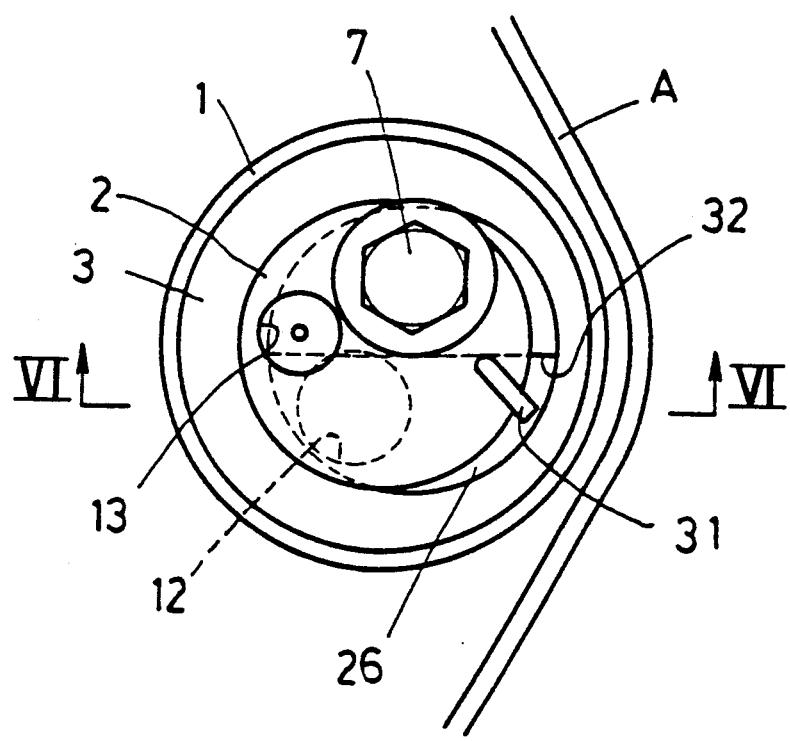
FIG. 5 is a front view of the same in the assembled state.
Figure 6:
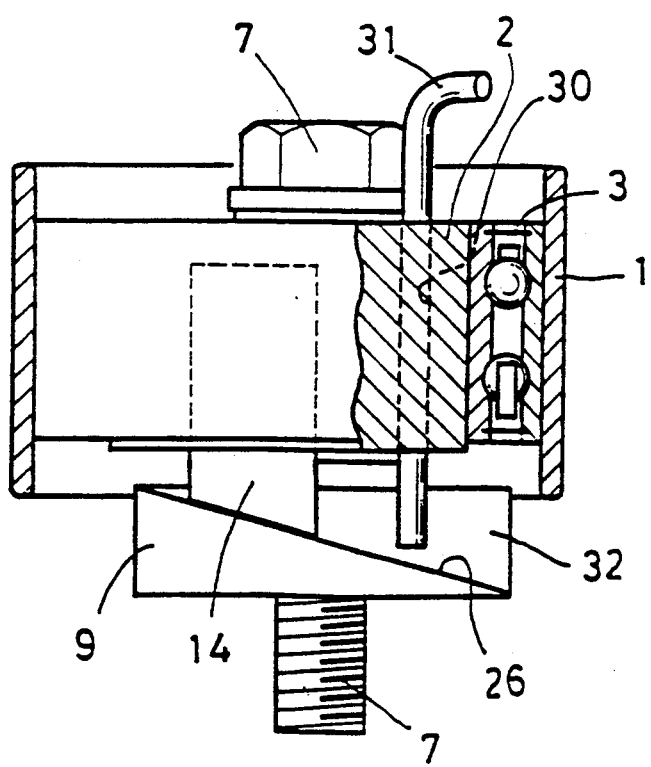
FIG. 6 is a sectional view taken along line VI—VI of FIG. 5.

As shown in FIGS. 5 and 6, the support member 2 is provided with a hole 30 through which a pin 31 for preventing rotation is inserted. The pin 31 is held in abutment with a shoulder 32 of the cam surface 26 to prevent the support member 2 from pivoting by means of the spring 23. Thus, the belt autotensioner can be set up without applying tension to the belt.

Now we shall describe the operation of the first embodiment.

The autotensioner of this embodiment is mounted on the mounting base 8 by tightening the fixing bolt 7 with the pin 31 set in the hole 30. Then the belt A is put around the pulley 1. After mounting the tension adjusting spring 29 on the plates 28, the pin 31 is pulled out. Now the pulley 1 turns counterclockwise in FIG. 1 under the spring force F2 of the spring 29 and pivots toward the belt A, stretching the belt.

Figure 7:
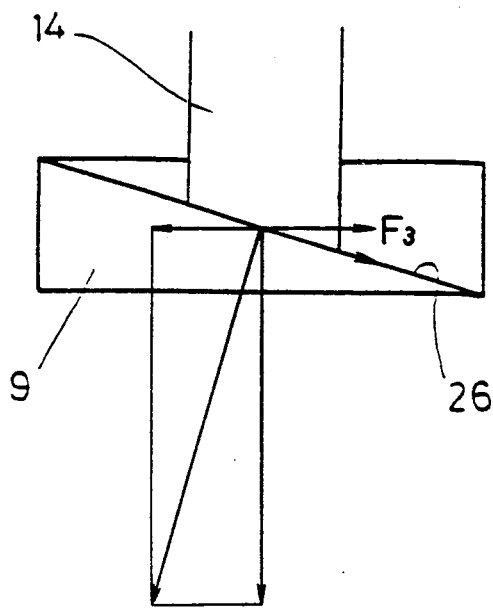
FIG. 7 is a view showing the relationship between forces.

When the engine is not in motion, a clockwise turning torque is applied to the pulley by the counterforce F1 of the tension of the belt A. Also, the pulley 1 is subjected to a counterclockwise turning torque by both the horizontal component F3 (FIG. 7) from the cam surface 26 and the spring force F2 of the spring 29. The pulley 1 is thus balanced in this state.

On the other hand, while the engine is in motion, the pulley 1 stops at a position where the minimum value of the turning torque by the fluctuating counterforce F1 of the belt balances with the turning torque which is the sum of the spring force F2 and the component F3, thus keeping the tension of the belt A constant.

In this state, when the pulley 1 is subjected to a turning torque by a belt tension F1 greater than the turning torque by the spring force F2 plus the component F3, the pulley 1 tends to turn clockwise. In this state, a load directed from the cam surface 26 of the fixed member 9 toward the piston 14 acts on the pulley 1 by the piston 14 disposed between the fixed member 9 and the support member 2.

This load is divided into a radial component and an axial one. The radial component acts on side walls of the piston 14 and the cylinder 12. On the other hand, the axial component acts to push back the piston 14 of the damper 60. As a result, the pressure in the pressure chamber 17 increases and the check valve 22 is closed, so that the oil pressure in the pressure chamber 17 between the piston 14 and the plunger 16, i.e. the back pressure of the piston 14 increases. This pressure supports the axial component. At the same time, hydraulic oil leaks through a gap between the bore 15 of the piston 14 and the plunger 16. The piston 14 is pushed in gradually corresponding to the amount of leakage of hydraulic oil and the pulley 1 turns clockwise slowly. The belt tension is thus kept constant.

In contrast to the above, if the turning torque by the belt tension F1 becomes lower than the turning torque by the spring force F2 of the tension adjusting spring 29 and the component F3, the pulley 1 turns counterclockwise. At the same time, the piston 14 will move away from the cam surface 26 of the fixed member 9, forming a gap therebetween.

In this case, the spring 23 provided between the plunger 16 and the piston 14 expands, so that the check valve 22 is opened and the back pressure of the piston 14 becomes zero. The piston 14 will protrude instantly, eliminating the gap therebetween. Thus, the pulley turns counterclockwise quickly. The belt tension is kept constant.

Figure 8:
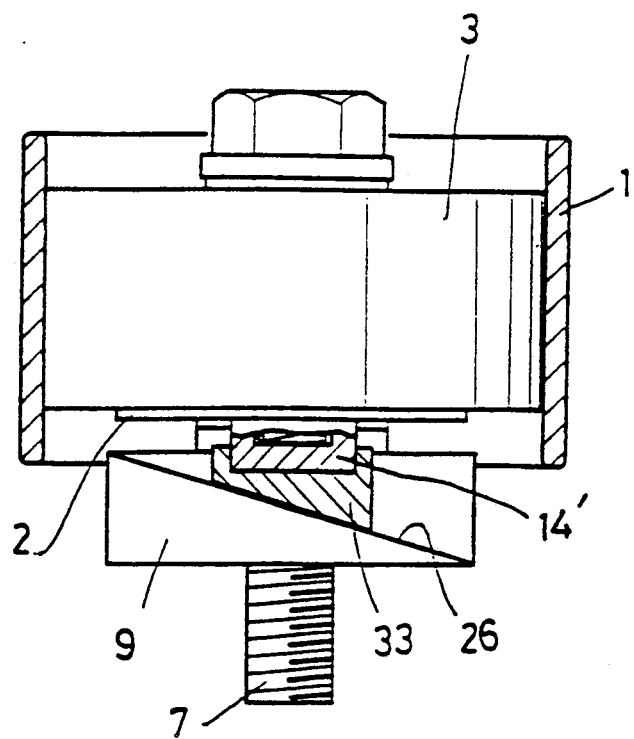
FIG. 8 is a partially vertical sectional side view of a second embodiment.

FIG. 8 shows the second embodiment in which a self-lubricating spacer 33 made of synthetic resin or an oil-containing bearing is provided between the piston 14 and the cam surface 26 of the fixed member 9. The spacer 33 serves to improve the lubricity between the piston 14 and the cam surface 26 and thus to improve the wear resistance of the piston 14 and the cam surface 26.

Figure 9:
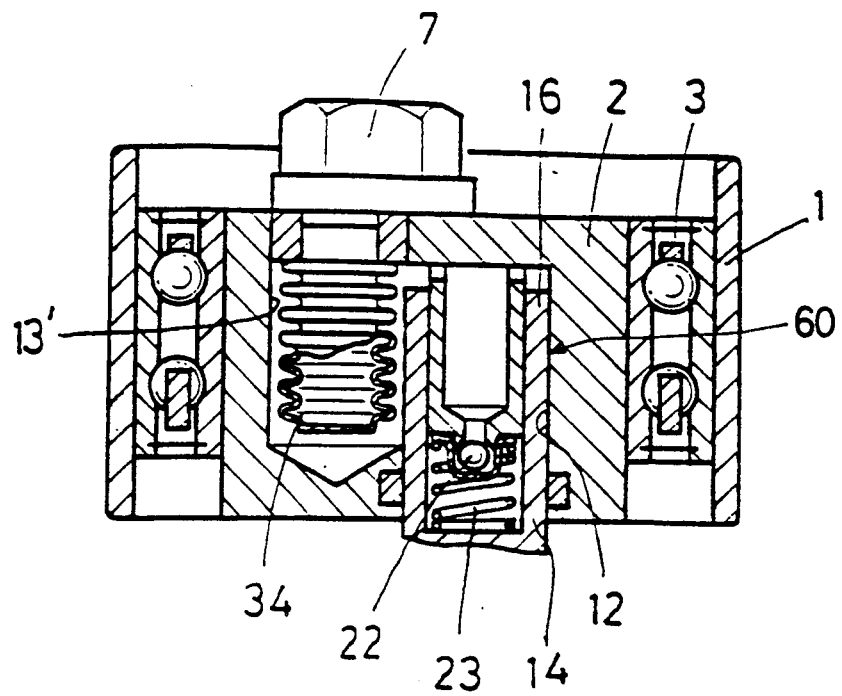
FIG. 9 is a sectional view of a third embodiment.

In the third embodiment shown in FIG. 9, a diaphragm 34 in the form of rubber or metal bellows is provided in the oil pressure adjusting chamber 13.

Figure 10:
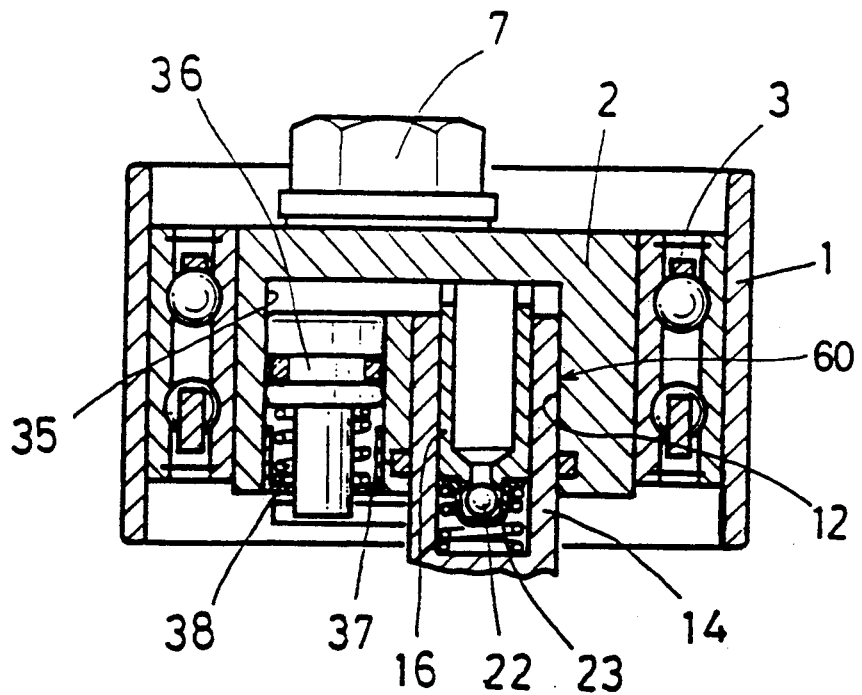
FIG. 10 is a sectional view of a fourth embodiment.
Figure 11:
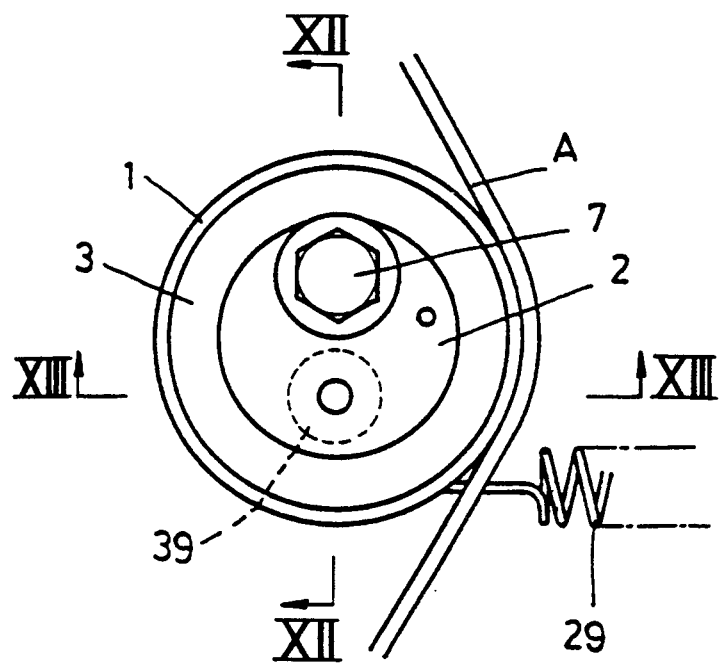
FIG. 11 is a front view of a fifth embodiment.
Figure 12:
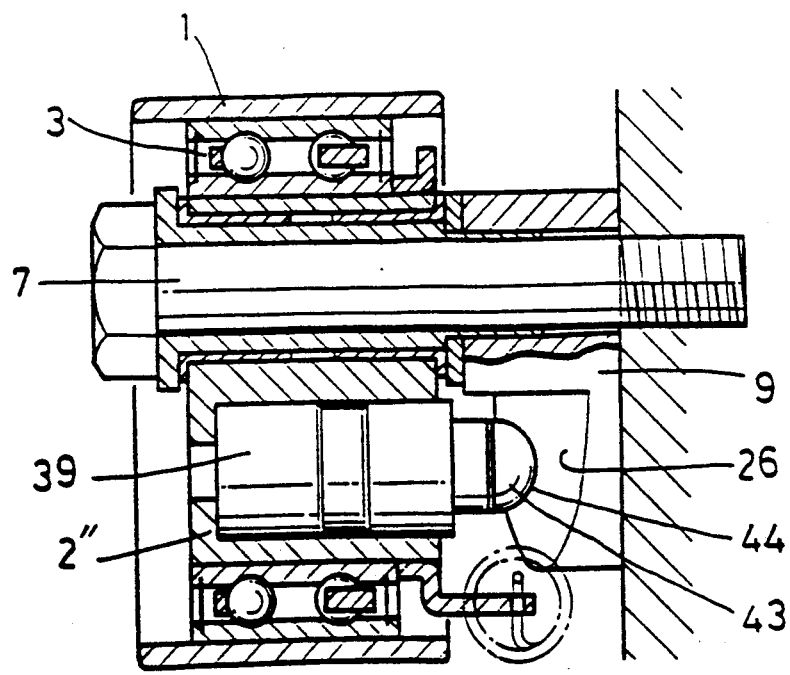
FIG. 12 is a sectional view taken along line XII—XII of FIG. 11.
Figure 13:
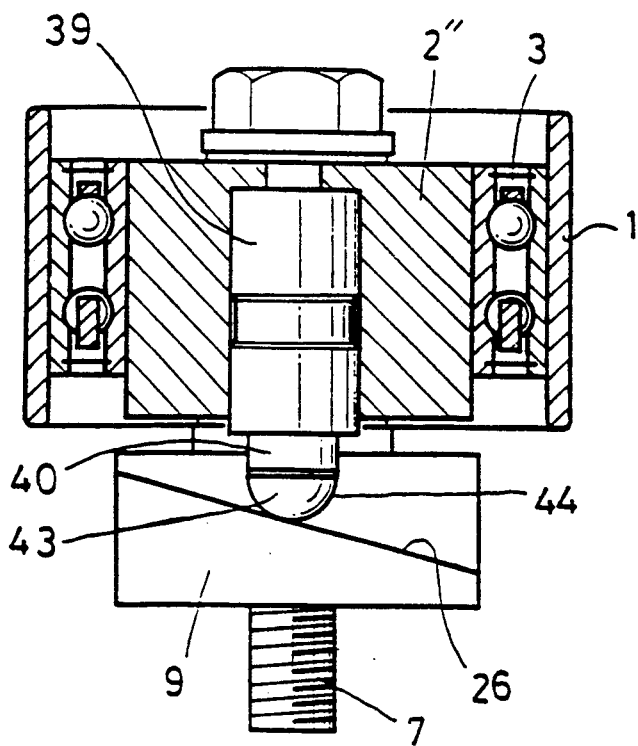
FIG. 13 is a sectional view taken along line XIII—XIII of FIG. 11.

In the fourth embodiment shown in FIG. 10, in place of the diaphragm, a pressure adjusting piston 36 is provided in an oil pressure adjusting chamber 35 provided under the support member 2. In this case, the oil pressure is set by adjusting the spring force of a spring 38 between the piston 38 and the retainer 37.

In the fifth embodiment shown in FIGS. 11-14, the oil pressure adjusting chamber in the support member 2 is omitted and the damper 60 is provided in a cylinder body 39 mounted in the support member 2.

Figure 14:
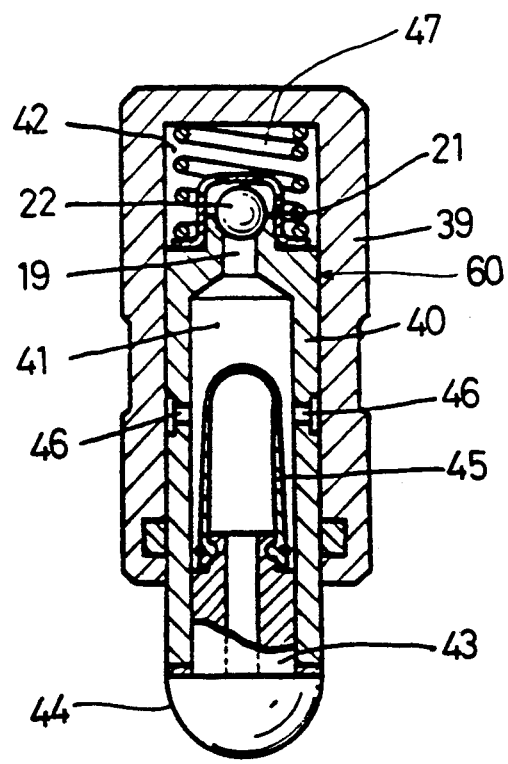
FIG. 14 is a partially vertical sectional side view of a portion of the same.

Namely, as shown in FIG. 14, a piston 40 is slidably mounted in the cylinder body 39. A closure plug 43 having a spherical end 44 is press-fitted in a reservoir chamber 41 formed in the piston 40. An oil pressure adjusting diaphragm 45 is secured to the rear end of the closure plug 43.

Oil holes 46 are formed in the side wall of the piston 40. A spring 47 is mounted between the piston 40 and the bottom of the cylinder body 39 to urge the piston 40 in such a direction as to protrude from the cylinder body 39.

In this arrangement, when the piston 40 is pushed in, the hydraulic oil in a pressure chamber 42 leaks through the oil holes 46 and minute gap around the piston 40 into the reservoir chamber 41, so that the piston 40 is pushed down gradually. In this case, the increase in oil amount in the reservoir chamber 41 is absorbed as the diaphragm 45 shrinks.

Figure 15:
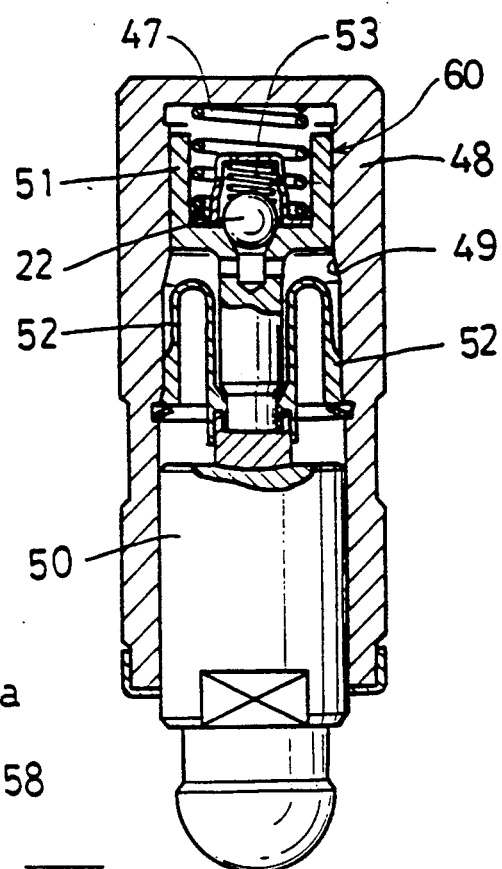
FIG. 15 is a partially vertical sectional side view of a sixth embodiment.
Figure 16:
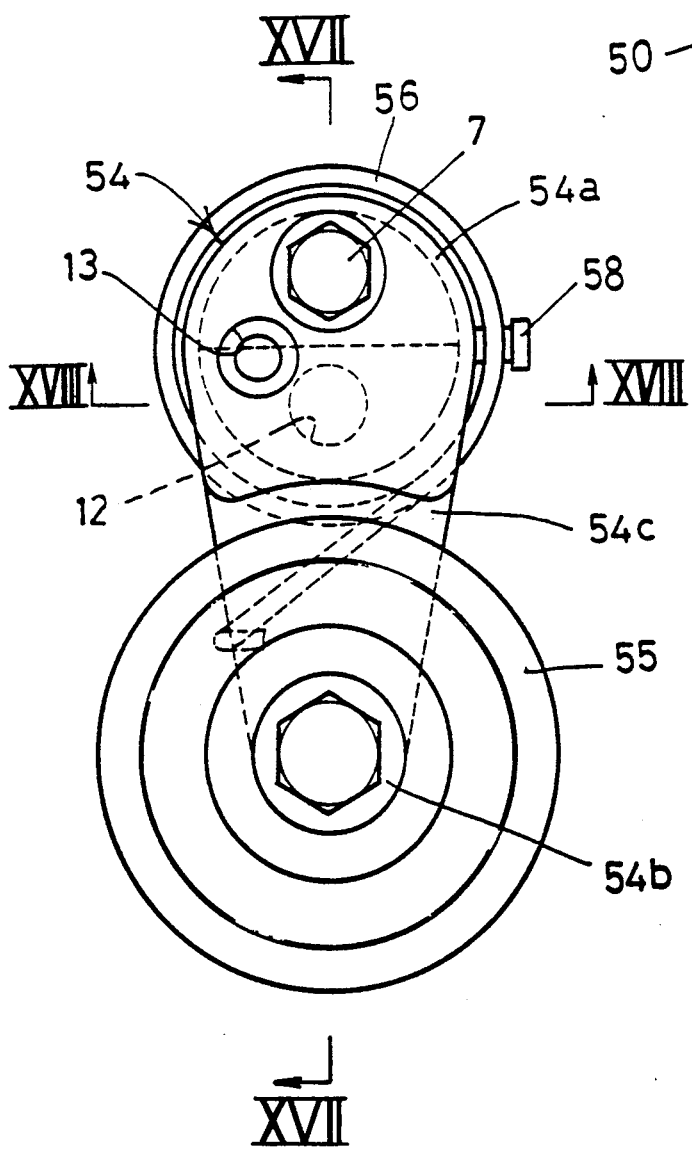
FIG. 16 is a front view of a seventh embodiment.
Figure 17:
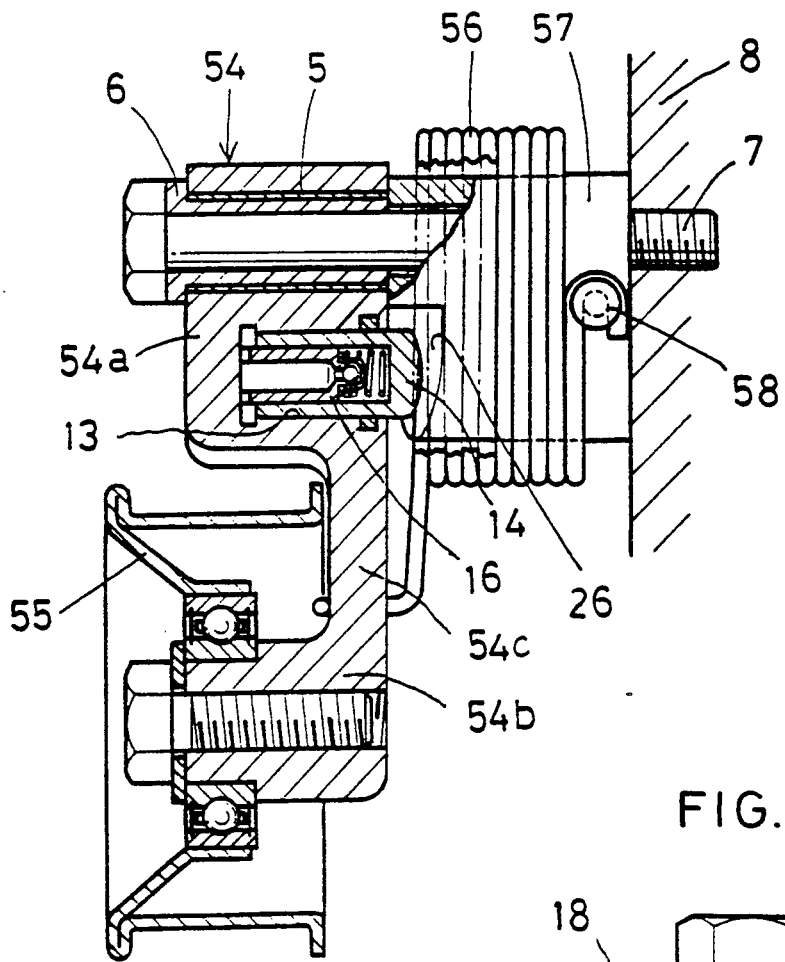
FIG. 17 is a sectional view taken along line XVII—XVII of FIG. 16.
Figure 18:
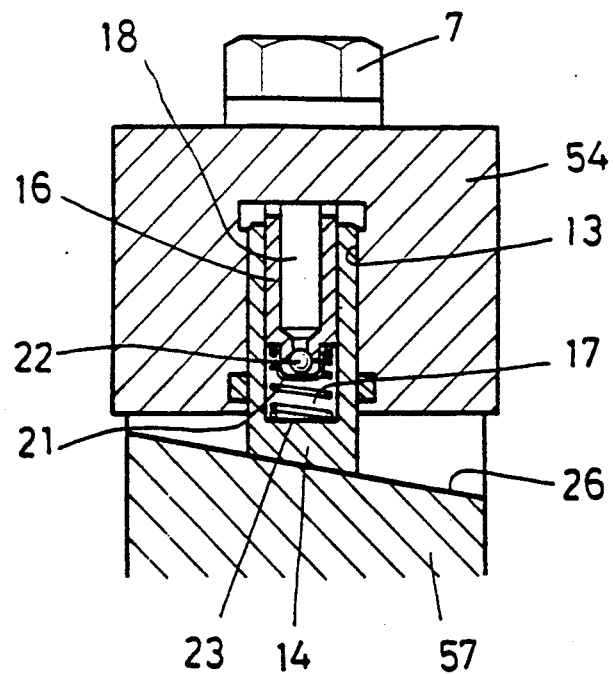
FIG. 18 is a sectional view taken along line XVIII—XVIII of FIG. 16.

The sixth embodiment shown in FIG. 15 is the same as the fifth embodiment except that a piston 50 and a plunger 51 are slidably mounted in a bore 49 of a cylinder body 48 and that diaphragms 52 as partitioning walls are provided in passages at both sides between the piston 50 and the plunger 51. In the figure, numeral 53 designates a spring for urging the check valve 22.

The seventh embodiment shown in FIGS. 16-19 relates to an autotensioner for a belt for driving an engine auxiliary.

A support body 54 is divided into a pivoting portion 54a through which the fixing bolt 7 extends and a pulley shank 54b supporting a pulley 55. These members are coupled together by an arm 54c.

A tension adjusting spring 56 is in the form of a helical spring wound around a pulley base 57. The spring 56 has one end thereof coupled to a pin 58 provided on the base 57 and the other end in engagement with the arm 54c of the support body 54 to urge the pulley 55 to turn counterclockwise in FIG. 16.

Figure 19:
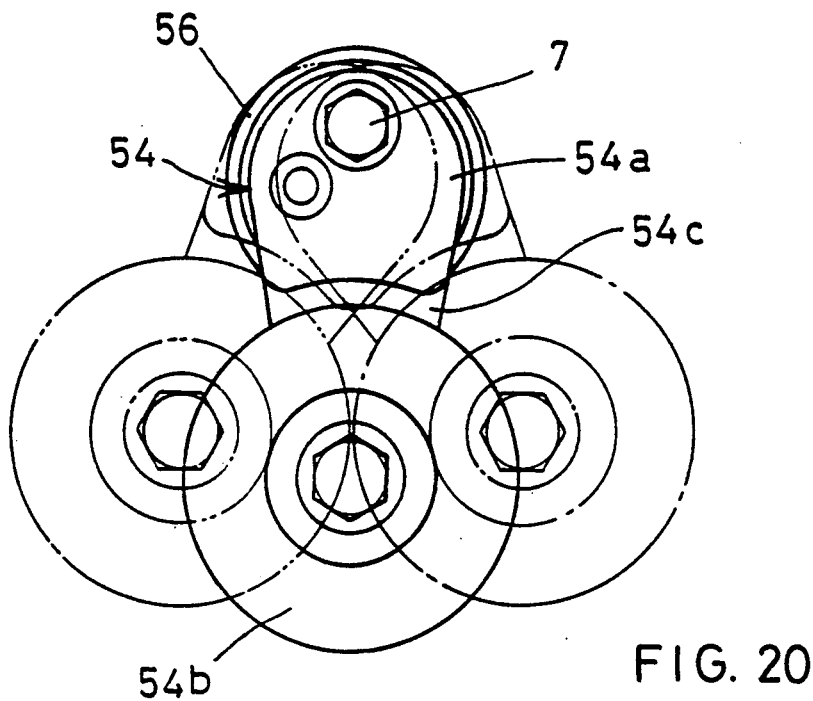
FIG. 19 is a front view of the same showing its operation.

As described above, since the pulley 55 is located apart from its pivoting center, its pivoting stroke increases as shown in FIG. 19. Thus, this device can be used for belts for driving engine auxiliary, which require the pulley to move by a greater distance.

Figure 20:
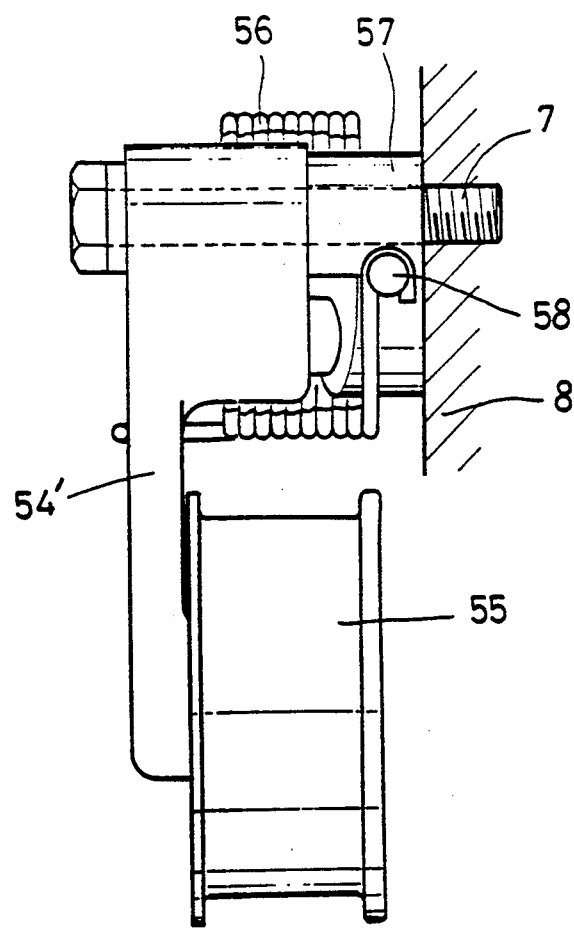
FIG. 20 is a side view of an eighth embodiment.
Figure 21:
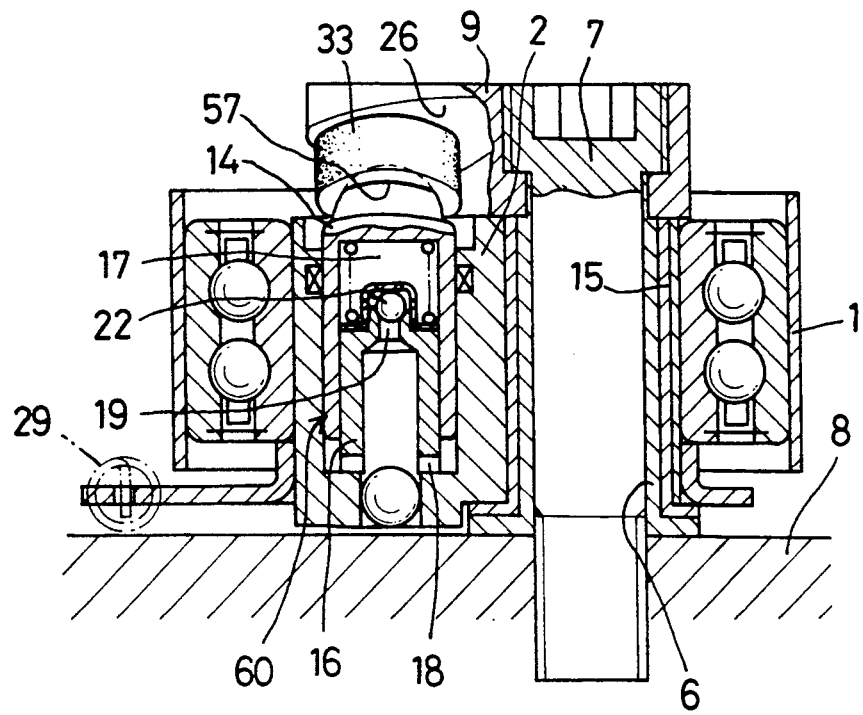
FIG. 21 is a partially vertically sectional front view of a ninth embodiment.
Figure 22:
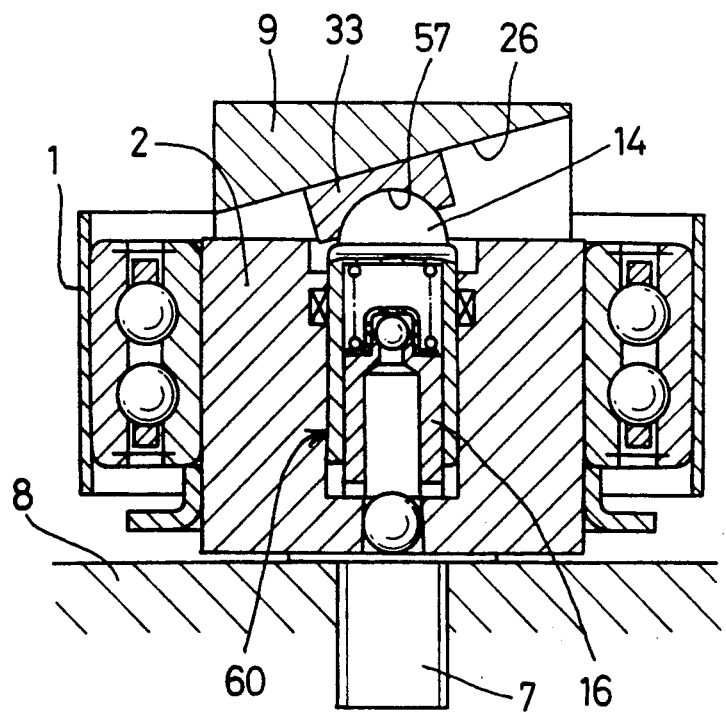
FIG. 22 is a vertical sectional side view of the same.
Figure 23:
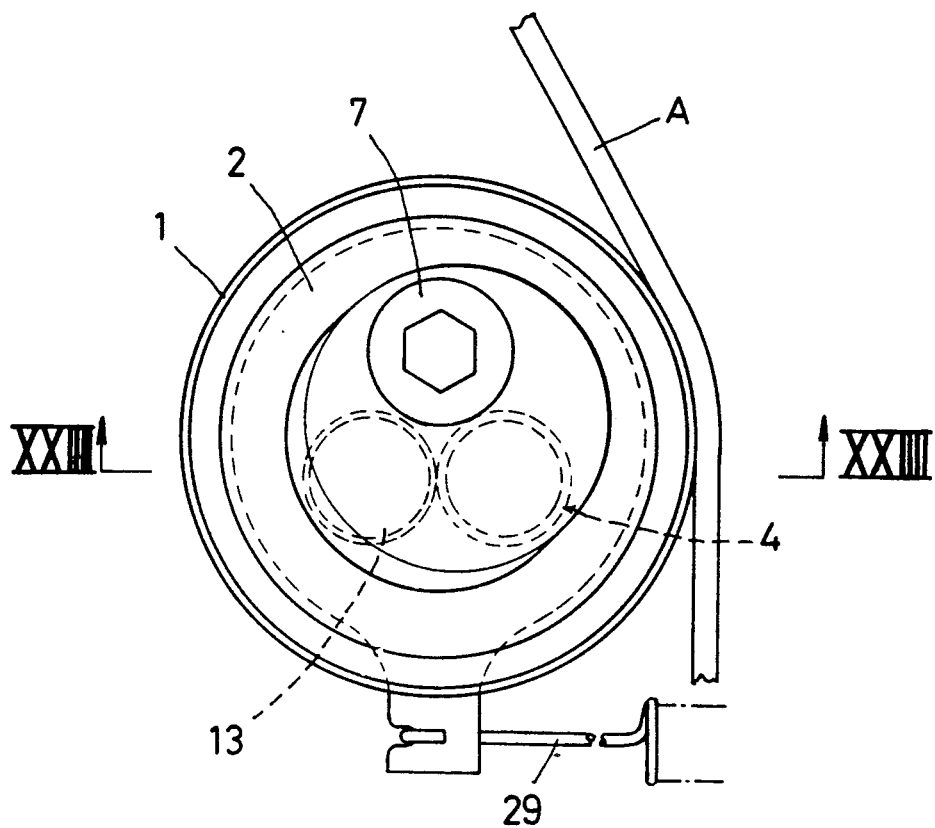
FIG. 23 is a plan view of the same.
Figure 24:
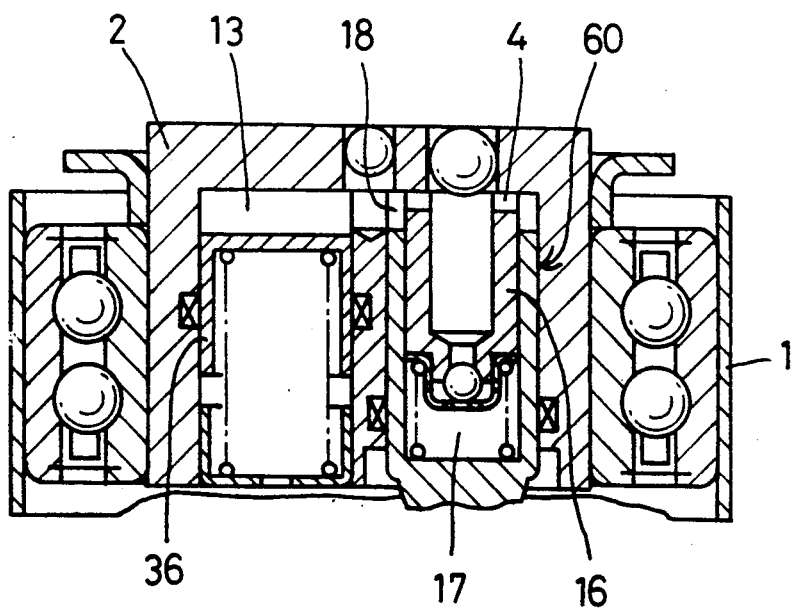
FIG. 24 is a sectional view taken along line XXIV—XXIV of FIG. 23.

In the eighth embodiment shown in FIG. 20, the pulley 55 is mounted in an opposite way to the pulley in the seventh embodiment. This arrangement is effective if the belt is provided nearer to the engine.

Next, in the ninth embodiment shown in FIGS. 21-25, the support member 2 is eccentrically pivotally mounted around the fixing bolt 7 fixed to the mounting base 8 through the collar 6 and a slide bearing 5' made of a polyimide resin. A fixed member 9, which also serves as a cam member, is fixed in position between the head of the fixing bolt 7 and the collar 6 and is formed with a cam surface 26 on the surface opposing the support member 2.

A piston 14 of the damper 60 is provided so as to be movable toward and away from the cam surface 26. The spacer 33 is disposed between the piston 14 and the cam surface 26. The spacer 33 is formed by injection molding polyimide resin and has a spherically recessed surface 57 in which the spherical head of the piston 14 is received.

Polyimide resin as the material for the spacer 33 may be either thermoplastic or thermosetting. Nowadays, many thermosetting materials which can be injection molded have been developed. Thermosetting resins of this type are most preferable for the spacer 33 which is required to have a high-temperature resistance and to be inexpensive.

Ordinarily, the fixed member with which the spacer 33 is in a frictional contact, is formed of a ferrous sintered metal or hardened steel and the piston 14 is of steel or a copper alloy. But they may by made of any other material as long as it has a high wear resistance and is suitable for use with polyimide resin.

Spacers 33 made of a thermosetting polyimide resin, gun metal and an oil-containing sintered alloy, respectively, and a fixed member 9 made of a ferrous sintered metal wear put to a durability wear test to measure wear. The results are shown in FIG. 25.

As shown in the figure, (B), which is the spacer 33 made of gun metal, showed a rapid progression of wear in a short time. (C), which is the spacer made of an oil-containing sintered alloy, also showed a rapid progression of wear. In contrast, (A), which is the spacer made of a polyimide resin, showed very little wear over a long period of time and a marked increase in life.

In the above embodiment, the spacer 33 is disposed between the piston 14 and the cam surface 26. But instead of providing the spacer, the end of the piston 14 may be formed of a polyimide resin and the end may be brought into abutment with the cam surface 26.

The fixed member 9 having the cam surface 26 may be mounted not on the head of the fixing bolt 7 but on the root of the fixing bolt 7 i.e. on the mounting base as in the first embodiment to press the piston 14 of the damper 80 provided in the support member 2 against the cam surface 26 of the fixed member 9. Otherwise, this embodiment is the same as the other embodiments.

In any of the above embodiments, the damper 60 is provided in the support member 2 and the cam surface 26 on the fixed member 9. But the operation is the same when the damper 60 is provided in the fixed member 9 and the cam surface 26 on the support member 2.

What is claimed is:

1. An autotensioner comprising a pulley, a fixing shaft, a pulley support member eccentrically supported on said fixing shaft so as to be pivotable, a tension adjusting spring coupled to said support member for applying torque to said support member in such a direction as to increase the tension of a belt, a fixed member provided opposite to said support member, a damper provided between said support member and said fixed member for damping the pivoting speed of said support member, characterized in that said damper comprises a cylinder provided in one of said support member and said fixed member, a piston mounted in said cylinder and an elastic member for urging said piston to protrude outwards from said cylinder, the other of said support member and said fixing member being provided with a cam surface abutting said piston, said cam surface being tapered downwards in such a direction that said support member pivots to increase the belt tension.

2. An autotensioner as claimed in claim 1, wherein said damper further comprises a check valve assembly comprising a plunger mounted in a bore formed in said piston for said bore into a pressure chamber and a reservoir chamber and a check valve having a communication hole through which said pressure chamber and said reservoir chamber communicate with each other, said check valve being adapted to open said communication hole when the pressure in said pressure chamber becomes lower than the pressure in said reservoir chamber.

3. An autotensioner as claimed in claim 1, wherein said support member is provided with an oil pressure adjusting chamber communicating with said reservoir chamber, said oil pressure adjusting chamber accommodating a pressure adjusting means for changing the volume of said oil pressure adjusting chamber according to the change in a hydraulic pressure.

4. An autotensioner as claimed in claim 1, wherein a body of said cylinder is mounted in said support member and wherein said damper is provided in said cylinder body.

5. An autotensioner as claimed in claim 1, further comprising a self-lubricating spacer disposed between said piston and said cam surface.

6. An autotensioner as claimed in claim 1, further comprising a pulley shank mounted on said support member through an arm to support a pulley thereon.

7. An autotensioner as claimed in claim 1, wherein said piston has its tip portion made of a polyimide resin.

8. An autotensioner as claimed in claim 1, further comprising a spacer made of an injection-moldable thermosetting polyimide resin and disposed between the tip of said piston and said cam surface.

* * * * *